UNITED STATES PATENT OFFICE.

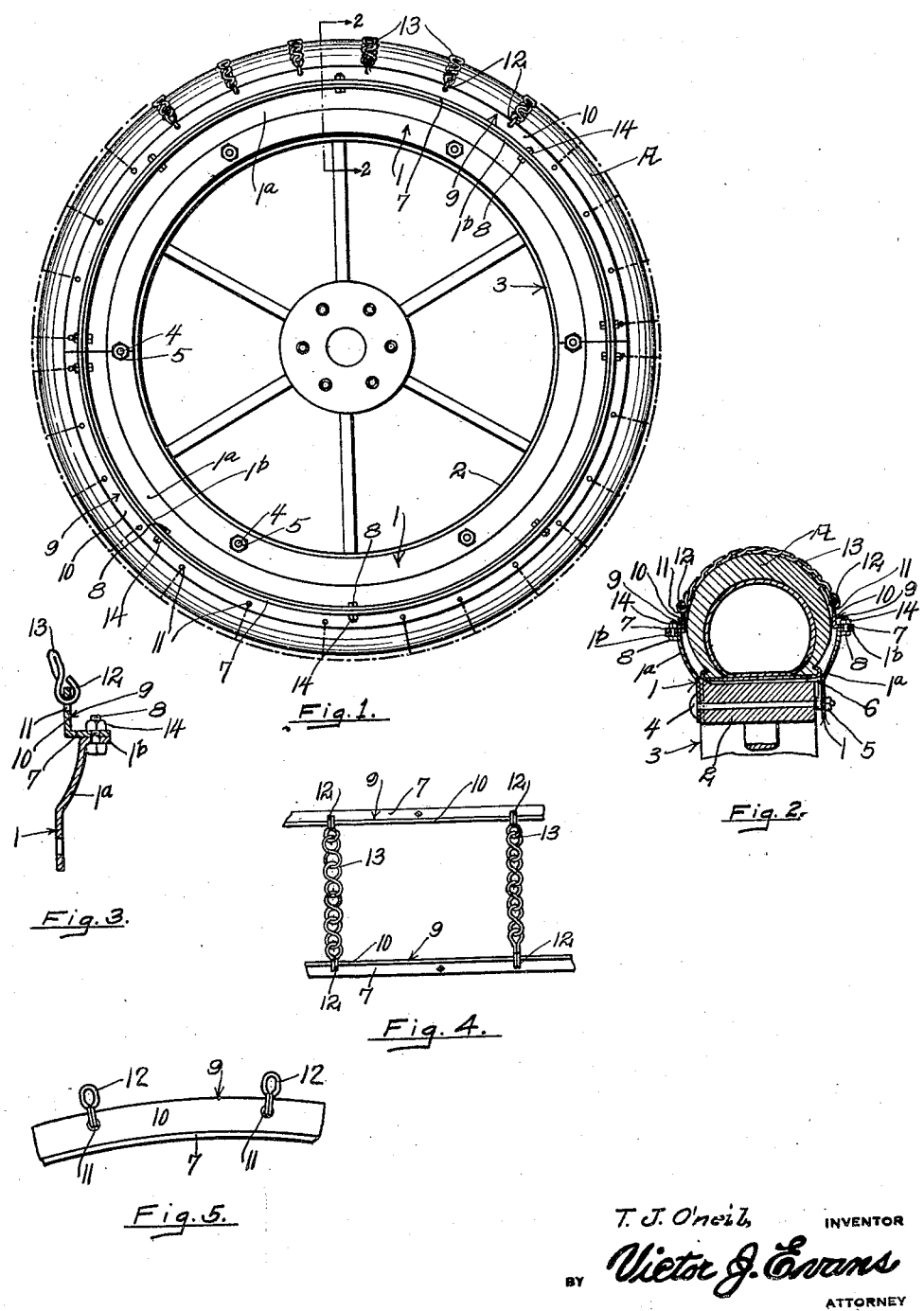

THOMAS J. O'NEIL, OF PITTSBURGH, PENNSYLVANIA.

ANTISKID DEVICE.

1,423,963.     Specification of Letters Patent.     Patented July 25, 1922.

Application filed November 25, 1921. Serial No. 517,562.

*To all whom it may concern:*

Be it known that I, THOMAS J. O'NEIL, a citizen of the United States, residing at Pittsburgh, in the county of Allegheny and State of Pennsylvania, have invented new and useful Improvements in Antiskid Devices, of which the following is a specification.

This invention relates to anti-skid devices, and more particularly to a device specially adapted for use in connection with automobile wheels.

One of the main objects of the invention is to provide a device of the character stated of simple construction and operation which may be readily applied or removed. A further object is to provide an anti-skid device of great strength which is capable of withstanding the strains to which it is subjected in use, this device, when removed, occupying a minimum of space. Further objects will appear from the detailed description.

In the drawings:—

Figure 1 is a side view of the device as applied.

Figure 2 is a section taken substantially on line 2—2 of Figure 1.

Figure 3 is a detail section through one of the securing plates and angle strips.

Figure 4 is a fragmentary top plan view.

Figure 5 is a fragmentary side view of one of the angle strips.

The device includes two pair of plates 1 of semi-circular outline which are adapted to be secured adjacent to the outer faces of felloe 2 of the wheel 3 by means of bolts 4 inserted through plates 1 and the felloe, a securing nut 5 being threaded on one end of the bolt. As will be understood, this bolt, when the device is used in connection with a demountable rim, can also be utilized for securing the rim securing clips as illustrated in Figure 2 in which the clip is shown at 6. Each of the plates 1 is provided with an outer arcuate extension $1^a$ which is adapted to extend about the side portion of tire A which is secured upon the wheel in any known or preferred manner. At its outer edge each plate is provided with an outwardly projecting flange $1^b$ to which is secured the inner flange 7, by means of bolts 8, or in any other suitable or preferred manner, of an angle strip 9 also of semi-circular shape. The outer flange 10 of strip 9 is provided with spaced perforations 11 to receive hooks 12 of cross chains 13 which extend across the tread portion of the tire.

By removing nuts 14 from bolts 8 the angle strips 9 may be readily detached from plates 1, these strips being connected in pairs by the chains 13 so that by placing the two strips together and wrapping the chains about the same, the device will occupy but little space and may be readily carried in the automobile. In attaching the device about the wheel one pair of strips 9 is secured to flanges $1^b$ of plates 1 about the upper portion of the wheel, after which the wheel may be turned over and the other pair of angle strips quickly and easily secured to the plates thus providing an anti-skid device completely surrounding the wheel and which can be readily applied or removed, as desired.

What I claim is:—

1. In a device of the character described, arcuate plates adapted to be secured to the opposite sides of an automobile wheel, arcuate strips arranged in pairs, cross chains connecting the strips of each pair, and means for securing said strips to the respective plates.

2. In a device of the character described, arcuate plates adapted to be secured to an automobile wheel at opposite sides thereof, said plates being provided at their outer edges with outwardly projecting flanges, arcuate angle strips arranged in pairs, cross chains connecting the outer flanges of said strips, and means for detachably securing the inner flanges of the strips to the flanges of said plate.

3. In combination with an automobile wheel, plates secured to said wheel at opposite sides thereof, arcuate strips detachably secured to said plates, and cross chains connecting said strips.

In testimony whereof I affix my signature.

THOMAS J. O'NEIL.